(12) United States Patent
Hession et al.

(10) Patent No.: US 9,024,993 B2
(45) Date of Patent: May 5, 2015

(54) SYSTEM AND METHOD FOR AUTOMATICALLY MANAGING PARTICIPATION AT A MEETING OR CONFERENCE

(75) Inventors: Patrick Hession, Mervue (IE); Tony McCormack, Mervue (IE); John Costello, Mervue (IE); Frank McGuire, Mervue (IE)

(73) Assignee: RPX Clearinghouse LLC, San Francisco, CA (US)

( * ) Notice: Subject to any disclaimer, the term of this patent is extended or adjusted under 35 U.S.C. 154(b) by 220 days.

(21) Appl. No.: 13/337,769

(22) Filed: Dec. 27, 2011

(65) Prior Publication Data

US 2012/0158848 A1 Jun. 21, 2012

Related U.S. Application Data

(63) Continuation of application No. 11/395,110, filed on Mar. 31, 2006, now Pat. No. 8,121,269.

(51) Int. Cl.
*H04N 7/14* (2006.01)
*H04L 12/18* (2006.01)

(52) U.S. Cl.
CPC ............ *H04L 12/1822* (2013.01); *H04L 12/18* (2013.01)

(58) Field of Classification Search
USPC .............................................. 348/14.01–14.08
See application file for complete search history.

(56) References Cited

U.S. PATENT DOCUMENTS

| | | | |
|---|---|---|---|
| 6,480,885 B1 * | 11/2002 | Olivier | 709/207 |
| 2003/0154072 A1 * | 8/2003 | Young et al. | 704/9 |
| 2004/0098386 A1 * | 5/2004 | Thint et al. | 707/3 |
| 2004/0243672 A1 * | 12/2004 | Markki et al. | 709/204 |

* cited by examiner

*Primary Examiner* — Maria El-Zoobi
(74) *Attorney, Agent, or Firm* — Christopher & Weisberg, P.A.

(57) ABSTRACT

A participant managing system which identifies potential invitees to a conference. A storage means maintains storing records of associations of persons at least one or more key words. During the preparation of the conference the system responds to the user's input of key words by identifying persons. The user is not obliged to make any selection of persons, only a selection of subjects by key words.

32 Claims, 3 Drawing Sheets

SYSTEM AND METHOD FOR AUTOMATICALLY MANAGING PARTICIPATION AT A MEETING OR CONFERENCE

RELATED APPLICATION

This application is a continuation of co-pending U.S. patent application Ser. No. 11/395,110, filed Mar. 31, 2006, now U.S. Pat. No. 8,121,269.

This invention relates to a system and method for managing participation at a teleconference and automatically inviting participants to the event in accordance with the topics associated with the participant.

The invention relates primarily to video and teleconferences, but is also related to meetings where the participants are physically present. It relates mainly to the means and method of automatically selecting participants according to the subjects to be discussed at the conference or to the subjects already being discussed if the conference has already started.

Organising a conference for multiple participants who may remotely located can be laborious and time-consuming. E-mail meeting organisation packages have taken some of the work out of the more tedious aspects of organising such an event: dispatching invitations to a plurality of invitees, with the possibility of arriving at a consensus for a time and/or venue have been made easier. Determining a mutually convenient time and/or location can be quickly finalised as long as all invitees have access to the same package.

One of the initial steps in organising such a conference is the selection of participants or invitees: the prime factor in becoming an invitee is the relevance of the topic of the meeting to the person in question. One is invited to attend a meeting if one can contribute to or benefit from the discussion.

However, knowing whose participation to a meeting could increase the success of a meeting is not always a straightforward exercise, especially if the candidate group is very large or the candidates are widely spread geographically. The meeting organiser may also be new to or unfamiliar with the group or not be in a position to know who the most appropriate persons are. Identifying the persons for which a particular subject may have some relevance can therefore in itself be a laborious task.

There is therefore a need to reduce or eliminate the work required of the decision maker to identify the persons for whom a conference subject may be relevant.

The object of the present invention is to provide a system which identifies potential invitees, by associating each topic with a number of potential invitees, such that the system operator (the conference organiser) merely has to state the subject or subjects of the meeting and the persons concerned are automatically identified.

The invention relates primarily to video and teleconferences, but is also related to meetings where the participants are physically present. It relates mainly to the means and method of selection of persons based on the relevance of the subject or planned subjects to them.

It is a system which is context-aware, in that the system links the context of a discussion to potential participants.

SUMMARY OF THE INVENTION

In a first aspect of the invention a participant managing system is provided comprising: a means for storing records of associations of persons at least to one or more keywords; a means for inputting data; a means for selecting from the maintaining means persons associated with the input data; and a means for outputting the selection. The input are key word data or person data, wherein the keywords may comprise any one or a combination of subjects, classifications or professional expertise etc.

The foregoing and further features of the present invention will be more readily understood from the following description of preferred embodiments, provided by way of example only and without limitation to the scope of the present invention as set out in the appended claims, with reference to the foregoing figures.

DETAILED DESCRIPTION OF THE PREFERRED EMBODIMENT

Figure 1:
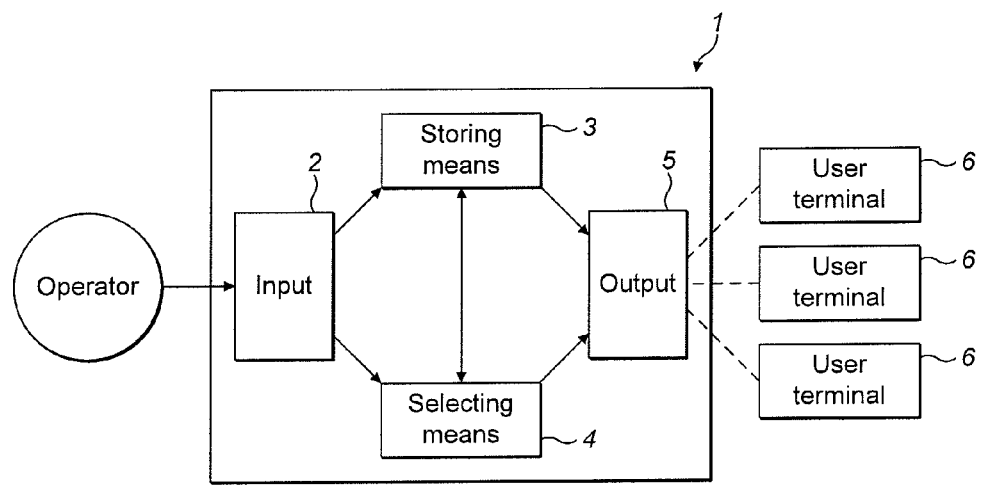
FIG. 1 illustrates the main components of the system.

The invention according to claim 1 is illustrated in FIG. 1. The system (1) includes an input (2) a storage means or data source (3), a selection means (4) and an output (5). The input (2) means communicates with the selection means (4) and extracts information from the storage means (3).

The invention eliminates a large amount of the preparation work for a conference by selecting potential participants according to topics associated with them: the conference organiser merely has to select the topics for discussion and the system replies with a list of potential participants, each of whom are associated with the input topics. The organiser then makes his selection from the list of potential participants and the invitations, thus creating a list of invitees.

The system stores names of persons and topics or subjects that are of interest to them or topics or subjects in which they hold a special expertise. The storage means (3) receives the topics in the form of key words and extracts the names of persons who are associated with the input words. For example, the operator (7) may be planning a culinary conference. The operator, may, for some reason, not be in a position to identify the appropriate persons himself, because, for example, he is new to the company or the persons concerned are located remotely. It may also be that the operator does know the appropriate persons, but they are too numerous or he does not have sufficient time to input all their names. In short there may be numerous reasons why it is easier for the operator to input a limited number of subjects or topics rather than a greater number of names of participants. The advantage of the proposed system is that the operator saves time and resources. An additional advantage of the system is that the operator is less dependent on his own memory of the persons concerned, thereby avoiding omissions and errors of essential contributors.

Figure 2:
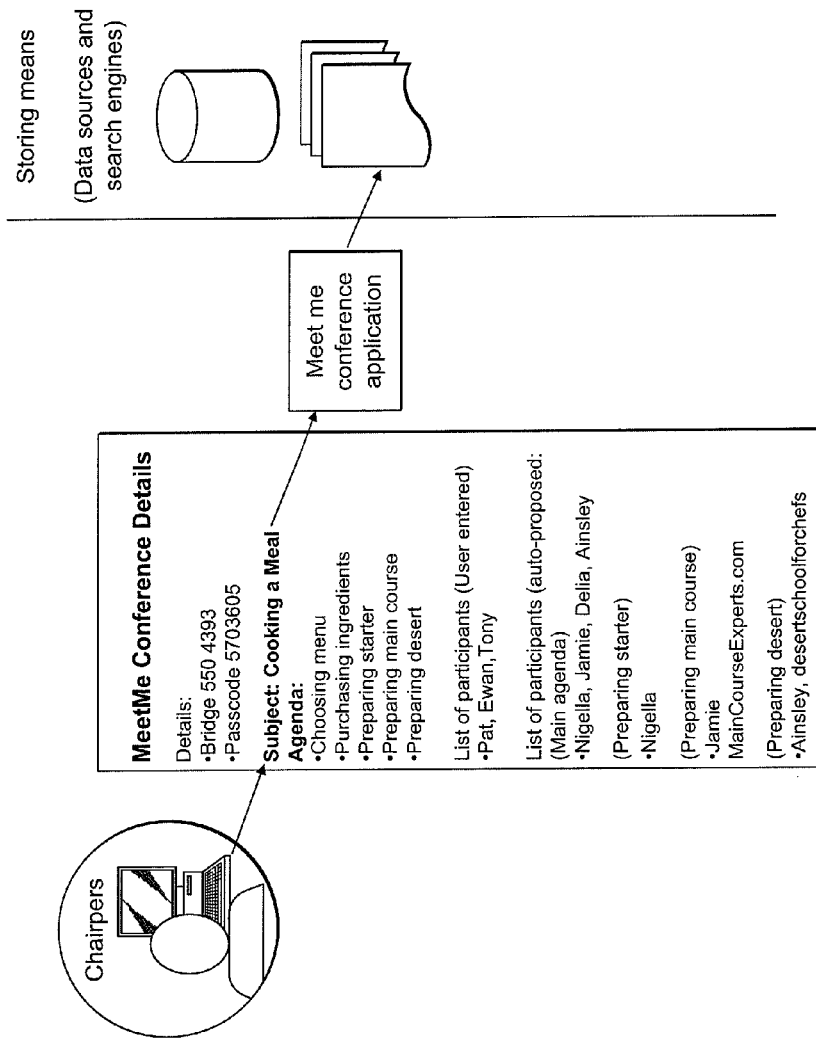
FIG. 2 illustrates a typical input of conference details including keywords.

FIG. 2 illustrates in general terms how the system functions. The operator simply has to input appropriate keywords associated with the forthcoming meeting. Using again the example of an operator planning a preparing a cookery conference, the input words could, for example, be "choosing a menu", "cooking a meal", "purchasing ingredients" or "preparing starter". Each person record stored in the system will have a number of associated topics or subjects: the database will then extract those person records for which there is there is an association with the input data "choosing a menu", "cooking a meal", "purchasing ingredients" or "preparing starter". The persons extracted from the system will then be entered on a list of candidate participants. In FIG. 1 the system has extracted the names Nigella, Jamie, Delia, etc. The list is output to the operator for him to select the candidates who will receive an invitation; he merely needs to scroll through the suggested names and select the persons who he deems appropriate. Additionally or alternatively, the operator may input a classification in the form of a professional expertise to identify, for example, potential participants who are recorded as being chefs, i.e. who are recorded as having an expertise specific to a conference topic.

There remains the possibility that the list proposed by the system is supplemented by the operator. Thus along with those selected by the system the operator may also add some further users known to him, such as Pat, Ewan and Tony. The system will allow both user input and its own proposals to be combined.

The system also envisages searching for potential participants in other data sources other than its own data storage, ie other internal databases (such as that managed by human resources), external databases, specialist internet search engines The database may also hold further information associated with each person such as location, internal rank or grade, etc. In FIG. 2 the names extracted and reproduced in the candidate list could therefore indicate that Nigella and Jamie are respectively Trainee Chefs, both being based in New York, while Ainsley is Celebrity Chef and works in London. The reader will appreciate that other relevant data could be associated with each person record on the database, such as security clearance or level, or identity of immediate superior. At a further level of complexity the system may also maintain levels of relevance of any particular keyword to a particular person: in this sense the word "ingredients" could induce a Level 2 indicator for Nigella and Jamie, while the relevance of "ingredients" for Ainsley is Level 1.

The operator retains the possibility of adding new records to the database. It could be that a new person joins the firm and the data source requires updating.

The operator also has a capacity to amend existing records, such that, for example, new associations could be added to existing records or new data could be input in a particular record. For example, it could be that the record for Claire has no association with "ingredient" because, for example, she is new to the company or she works in a nominally non-culinary area and her linkage to culinary matters has only recently been established. Similarly, Tony may have relocated from New York to London or he may have been promoted from trainee to manager and his record requires updating to show his new location and/or rank.

Moreover, there may be a need to supplement the candidate list output on the basis of the association of persons with particular keywords, without updating the records in the database. For example, the candidate list output on the basis of the words "choosing a menu", "cooking a mean", "purchasing ingredients" or "preparing starter", may omit a person vital to the success of the conference, but who nevertheless has no association with the key words. Taking again the operator planning the culinary conference (with the aforementioned key words), it may be desirable that the marketing director, who is normally not linked to the relevant key words, is present. The operator therefore has the possibility of supplementing the output candidate list, adding any persons not automatically extracted from the data source.

One can also consider any conference as a series of separate discussions, with varying levels of interest or relevance to the individual participants. A high-level conference may encompass a vast number of subjects over an extended period of time, but only a core group of participants are interested in all the subjects covered. This would mean that for the other participants to the conference the relevance of the conference varies according to the current subject of discussion. In the extreme case it could be that the meeting has no interest at all for a particular participant except for an isolated discussion which is limited in time. It is a further object of the current invention to alert users of the system to the topic under current discussion and for them to tailor their participation to the conference accordingly. This permits greater efficiency in the allocation of time and resources.

The non-uniform relevance over time is addressed in a number of aspects of the invention. Firstly, it could be the organiser of the event who, from the outset, divides the overall event into a series of discussions or sub-meetings, such that he can then input key words for each sub-meetings in the way already previously described. In accordance with the aspects already disclosed, the system responds by producing a number of candidate lists for each of the sub-meetings, such that participation varies according to the topic currently under discussion.

Figure 3:
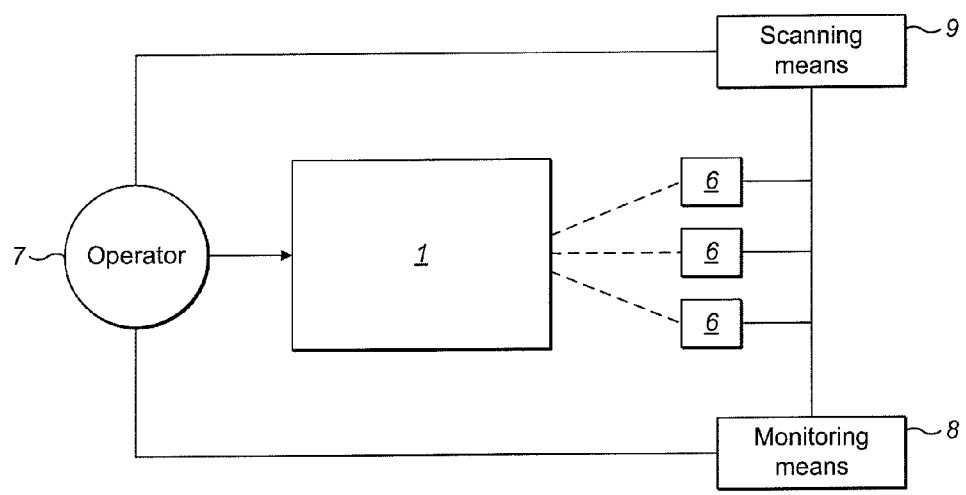
FIG. 3 illustrates a further embodiment of the invention during a conference session.

Secondly, the topic of discussion may vary in an unexpected or unscheduled way, such that the timings of the individual discussions are not known to the organiser in advance of the event. The flow of the discussion can be monitored by the operator such that he can input the keywords into the system (as described previously) in accordance with the variation in the subject. Accordingly, the system responds to each input by the operator with a new candidate list, the operator makes his selection and the list of invitees is drawn up by the system and invitations dispatched. Participants can come and go in accordance with messages sent out by the operator in response to lists generated by the system after his input of the current key words. There remains also the possibility that the operator will input specific names, irrespective of the names selected from the data source. This would provide combination of directly input names and names proposed on the basis of key words Alternatively, the system can automatically monitor the discussion and the current subject, as illustrated in FIG. 3, without the operator of the system having to intervene by repeatedly inputting new key words. In this mode the system notes the words used by the participants to the discussion using a speech recognition means and automatically identifies the keywords in the current discussion. This allows the system to make further extractions from the database based on the new keywords as they arise and to produce new candidate participant lists. The new lists can then be submitted to the operator as before.

For both of these alternatives, instead of submitting candidate lists to the operator, the system can be configured such that alerts are sent automatically to the potential candidate directly without any further selection by the operator. This not only reduces the input of and saves the resources of the operator, but also reduces the time till receipt by the invitee and to alert important potential participants (eg relevant experts) who have been overlooked previously, but their contribution is then urgently required. This mode of operation would also be appropriate where a large number of topics is envisaged and hence a high "turnover" of participants.

There is no reason why this process would not lead to the multiple entries of participants who join, then leave and then re-join the conference, being alerted directly or indirectly, when their topics are being discussed. Relevancy peaks and repeat relevancies may induce a high circulation of participants.

The conference management system also allows the operator to benefit from other conferences already arranged. The operator will be alerted to the existence of previous conferences with the same or a similar title or content. In such cases the system could make available minutes from the earlier meeting and also give an indication (in quantitative terms) of the degree of overlap of the two conferences.

A further benefit of the current invention is the possibility of utilising data derived from each completed conference to update the database for use in subsequent events. This functions either in the automatic mode described above, whereby, the monitoring system itself identifies the keywords or in a manual mode whereby the operator inputs new data. In both cases new topics, new persons and new associations of topics to associations can be used to update the database records, providing a more accurate basis for future participant selections in subsequent meetings.

As described previously, the storage means could be a database with data supplemented by external or specialist data sources, etc. The selection means could be a search engine. The storing means may also hold further information associated with each person such as location, internal rank or grade, relevance level for particular keywords, etc. In a further aspect of the invention the operator of the system may himself assign variables to individual participants. This further adds to the efficiency of the participant identification process and reduces the time required to identifying the final participant list. This feature can also be used to assign variables to individual participants for use during the discussion itself, such as speaker status or merely observer status (without right of intervention). Similarly the operator may assign blocking facilities to individual participants, giving the chairman of the meeting the power to cut the microphone, or where desired, some participants may be given full speaker rights, meaning that the microphone cannot be removed from them during their intervention.

The system has been described in broad terms, but operates by means of appropriate hardware and software designed to facilitate the system herein described.

The reader will appreciate that the modifications and variations may be made within the scope of this invention which is defined by the appended claims.

What is claimed is:

1. A method of enabling a conference manager to manage participants in a conference session, the method comprising:
   maintaining a database associating each of a plurality of persons with at least one respective keyword, maintaining the database including maintaining a relevance indicator for each keyword associated with each person, the relevance indicator indicating a level of relevance of the keyword to the respective person;
   in response to keyword identification by the conference manager:
      determining persons of the plurality of persons that are associated with at least one identified keyword;
      presenting a list of the determined persons associated with at least one identified keyword to the conference manager; and
   in response to selection of at least one person from the list of the determined persons by the conference manager, establishing a conference session including the conference manager and the selected at least one person.

2. The method of claim 1, further comprising enabling keyword identification by the conference manager by:
   presenting a list of keywords to the conference manager; and
   enabling selection of at least one presented keyword.

3. The method of claim 1, further comprising enabling the conference manager to search the database by keyword.

4. The method of claim 1, further comprising enabling the conference manager to search outside the database for associations of persons with keywords.

5. The method of claim 1, further comprising enabling the conference manager to store associations of persons with keywords in the database.

6. The method of claim 1, further comprising:
   monitoring which persons are actively connected to the conference session;
   identifying at least one person associated with at least one keyword who is not actively connected to the conference session; and
   during the conference session, presenting a list comprising the at least one identified person to the conference manager.

7. The method of claim 6, further comprising, in response to selection of at least one person from the list comprising the at least one identified person, adding the selected at least one person to the conference session.

8. The method of claim 1, further comprising:
   scanning words used by participants in the conference session; and
   identifying a current topic based on the scanned words.

9. The method of claim 8, further comprising:
   identifying at least one person associated in the database with at least one keyword corresponding to the current topic; and
   presenting a list comprising the identified at least one person to the conference manager.

10. The method of claim 9, wherein identifying at least one person associated in the database with at least one keyword corresponding to the current topic comprises identifying at least one person associated in the database with at least one keyword corresponding to the current topic who is not actively connected to the conference session.

11. The method of claim 9 further comprising, in response to selection of at least one person from the list comprising the at least one identified person, adding the selected at least one person to the conference session.

12. The method of claim 8, further comprising associating words used by participants in the conference session with respective participants in the database.

13. The method of claim 8, wherein scanning words used by participants comprises applying speech recognition to speech signals received from participants in the conference session.

14. The method of claim 1, wherein maintaining a database associating each of a plurality of persons with at least one respective keyword comprises storing associated characterizing information in association with each person, the characterizing information characterizing the associated person.

15. The method of claim 1, wherein the conference session comprises at least one of a voice teleconference, a video teleconference and a meeting where participants are physically present.

16. A system for enabling a conference manager to manage participants in a conference session, the system comprising:
   a database configured to associate each of a plurality of persons with at least one respective keyword, the database configured to store a relevance indicator for each keyword associated with each person, the relevance indicator indicating a level of relevance of the keyword to the respective person; and a user interface configured:
  in response to keyword identification by the conference manager, to:
    determine persons of the plurality of persons that are associated with at least one identified keyword;
    present a list of the determined persons associated with at least one identified keyword to the conference manager; and
  in response to selection of at least one person from the list of the determined persons by the conference manager, to establish a conference session including the conference manager and the selected at least one person.

17. The system of claim 16, wherein the user interface is further configured to enable keyword identification by the conference manager by:
  presenting a list of keywords to the conference manager; and
  enabling selection of at least one presented keyword.

18. The system of claim 16, wherein the user interface is further configured to enable the conference manager to search the database by keyword.

19. The system of claim 16, wherein the user interface is further configured to enable the conference manager to search outside the database for associations of persons with keywords.

20. The system of claim 16, wherein the user interface is configured to enable the conference manager to store associations of persons with keywords in the database.

21. The system of claim 16, further comprising:
  a conference monitor configured to monitor which persons are actively connected to the conference session, wherein the user interface is further configured:
    to identify at least one person associated with at least one keyword who is not actively connected to the conference session; and
    to, during the conference session, present a list comprising the at least one identified person to the conference manager.

22. The system of claim 16, wherein the user interface is further configured, in response to selection of at least one person from the list comprising the at least one identified person, to add the selected at least one person to the conference session.

23. The system of claim 21, wherein the conference monitor is further configured:
  to scan words used by participants in the conference session; and
  to identify a current topic based on the scanned words.

24. The system of claim 23, wherein the user interface is further configured:
  to identify at least one person associated in the database with at least one keyword corresponding to the current topic; and
  to present a list comprising the identified at least one person to the conference manager.

25. The system of claim 24, wherein the user interface is configured to identify at least one person associated in the database with at least one keyword corresponding to the current topic by identifying at least one person associated in the database with at least one keyword corresponding to the current topic who is not actively connected to the conference session.

26. The system of claim 24, wherein the user interface is further configured, in response to selection of at least one person from the list comprising the at least one identified person, to add the selected at least one person to the conference session.

27. The system of claim 23, wherein the database is further configured to associate words used by participants in the conference session with respective participants.

28. The system of claim 23, wherein the conference monitor is further configured to scan words used by participants by applying speech recognition to speech signals received from participants in the conference session.

29. The system of claim 16, wherein the database configured to associate each of a plurality of persons with at least one respective keyword comprises a database configured to store associated characterizing information in association with each person, the characterizing information characterizing the associated person.

30. The system of claim 16, wherein the conference session comprises at least one of a voice teleconference, a video teleconference and a meeting where participants are physically present.

31. The method of claim 1, further comprising:
  automatically identifying at least one keyword used by participants during the conference session;
  determining persons of the plurality of persons that are associated with at least one keyword used by participants in the conference session; and
  automatically sending an alert to the determined persons of the plurality of persons to join the conference session.

32. The system of claim 16, further comprising:
  a conference monitor configured to:
    monitor persons that are actively connected to the conference session; and
    identity at least one keyword used by participants in the conference session; and
  the user interface is further configured to:
    identify persons associated with the at least one keyword used by participants during the conference session who is not actively connected to the conference session; and
    automatically send an alert to the determined persons of the plurality of persons to join the conference session.

* * * * *